Aug. 12, 1969  K. F. BRAEUNINGER ET AL  3,460,304

STRUCTURAL PANEL WITH INTERLOCKING EDGES

Filed May 20, 1966

INVENTORS.
Karl F. Braeuninger
BY Gordon K. Glaza
Earl D. Ayers
AGENT

United States Patent Office 3,460,304
Patented Aug. 12, 1969

3,460,304
STRUCTURAL PANEL WITH
INTERLOCKING EDGES
Karl F. Braeuninger, Ferguson, Mo., and Gordon K.
Glaza, Midland, Mich., assignors to The Dow Chemical
Company, Midland, Mich., a corporation of Delaware
Filed May 20, 1966, Ser. No. 551,718
Int. Cl. E04c *1/30;* E04b *2/28*
U.S. Cl. 52—588                                    3 Claims

ABSTRACT OF THE DISCLOSURE

This invention relates to composite structural member composed of at least two elongated structural sections which are placed together along abutting lengthwise edges and then locked together by bending adjacent upper and lower edge parts of the sections to engage the adjacent edges of the abutting sections.

Figure 1:
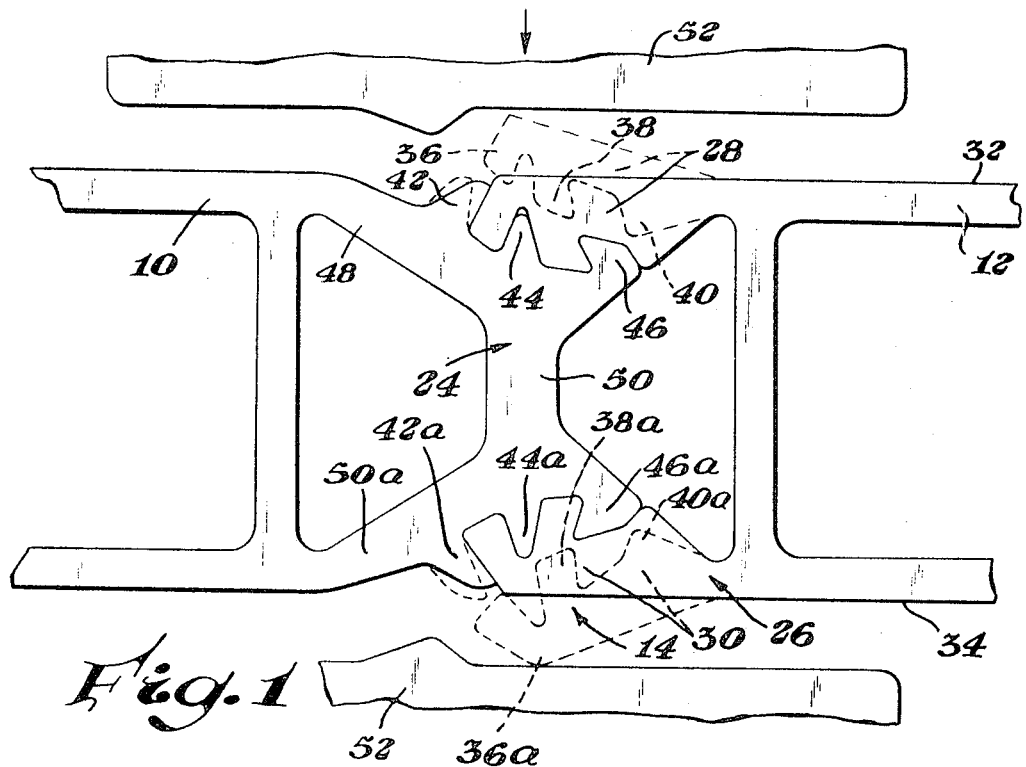

The locked together top and bottom edges have interlocking upper and lower tooth-like elements which engage each other and become fixed in position as the upper and lower edges are bent. The configuration of the locking joint is arranged in a way which minimizes functional forces which would tend to unlock the joint.

---

This invention relates to structural units which are adapted to be interlocked with each other to provide a deck or surface which may be used as a temporary road way, aircraft runway, or the like.

Such structural units are usually made in the form of elongated planks which have interlocking sides and end parts. Usually the units have a more or less flat top and bottom parts which are spaced apart and joined by a plurality of web elements which extend longitudinally of the units.

Because such units are desirable for use in making temporary military aircraft landing fields, or for any purpose where the units must be transported a considerable distance to their point of usage, the units should be as light as possible consistent with the strength necessary to sustain the heavy loads encountered. Further, the weight per structural unit should be light enough to permit manual handling during assembly of the runway or road.

In the past, if the top, bottom and webbing parts were made light enough to be acceptable from the standpoint of the gross weight of the structural unit, such units had a tendency to break near the end parts, e.g., at or near where the extruded mat section joins the coupling connector, where the units were joined together in an interlocking manner. However, recent developments have substantially eliminated this tendency. See, for example, applicant's co-pending application Ser. No. 453,280, filed May 5, 1965, for "Improved Structural Unit."

Another problem has arisen, however, because it is desired to have each structural unit made with a width of, for example, 24 inches. In a defense emergency, production of such 24 inch units is limited to plants having large diameter extrusion presses. To alleviate this problem, a need exists for structural units of lesser width which may be combined to form a composite structural unit having the standard width of 24 inches, for example.

An object of this invention is to provide a composite structural unit especially adapted for use in making temporary aircraft landing runways.

A further object of this invention is to provide an improved, strong, simple to assemble, composite structural unit.

In accordance with this invention there is provided a composite structural member composed of at least two elongated structural sections which are placed together along abutting lengthwise edges and then locked together by bending adjacent upper and lower edge parts of the sections to engage the adjacent edges of the abutting sections.

The outer peripheral edges have end and side coupling means in any suitable form, such as those disclosed and claimed in applicant's co-pending application Ser. No. 453,280, filed May 5, 1965, for "Improved Structural Unit," for example, now U.S. Patent No. 3,319,543.

The locked together top and bottom edges have interlocking upper and lower tooth-like elements which engage each other and become fixed in position as the upper and lower edges are bent. The configuration of the locking joint is arranged in a way which minimizes functional forces which would tend to un-lock the joint.

Figure 2:
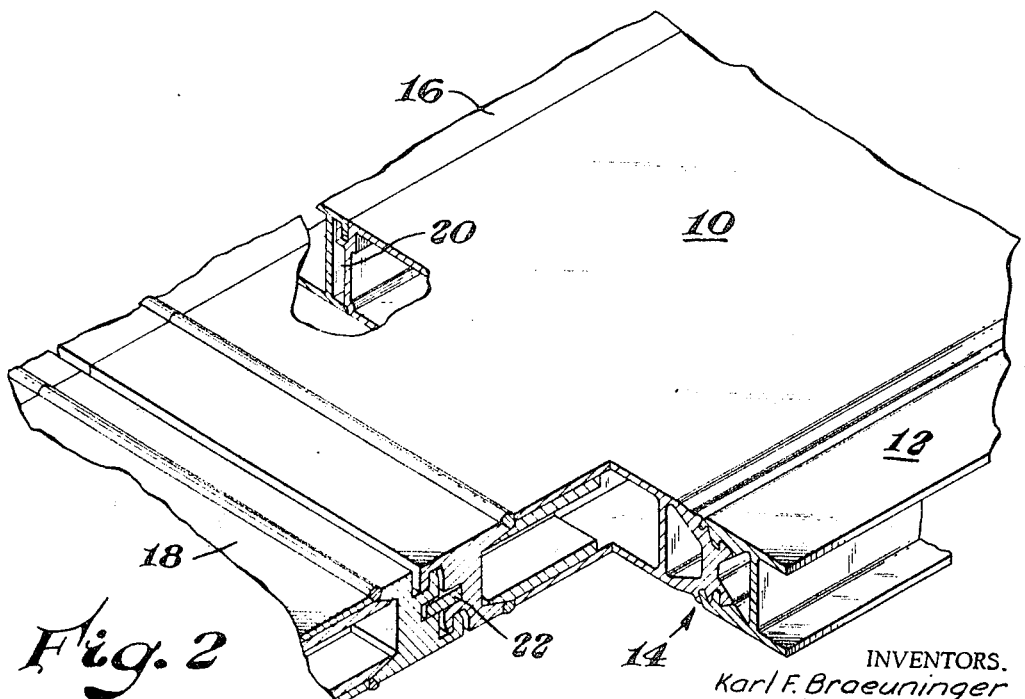

The invention, as well as additional objects and advantages thereof, will best be understood when the following detailed description is read in connection with the accompanying drawings, in which:

FIG. 1 is a fragmentary end elevational view of a composite structural unit in accordance with this invention; and FIG. 2 is a fragmentary isometric view showing the manner of joining the end sections together to form a composite structural unit.

Referring to the drawing, there is shown in FIG. 2 a pair of elongated webbed sections 10, 12 usually made of metal which are locked together along a tapered self-locking formed multiple joint, indicated generally by the numeral 14, to form a composite, rigid structural unit.

An adjacent composite unit 16, is attached to the section 10 by the coupling 20, or by any other suitable coupling.

An end-adjacent unit 18 is attached to the end of the section 10 by means of a suitable coupling, such as the coupling joint 22. The couplings 20 and 22 are each described in applicant's co-pending application Ser. No. 453,280 referred to above.

The interior of the sections 10, 12 may be of any suitable form, such as that disclosed in the above-mentioned application Ser. No. 453,280, for example.

Referring now to FIG. 1 as well as FIG. 2, it may be seen that the multiple joint 14 is composed of a male section 24 attached to or integral with a lengthwise edge of the section 10 and a female section 26 attached to or integral with a lengthwise edge of section 12.

The female section 26 comprises an upper part 28 and a lower part 30 which, before the sections 10 and 12 are attached, are bent at an acute angle above or below, respectively, the planes of the flat surfaces 32, 34, respectively.

Each of the parts 28, 30 contain three similar protuberances 36, 38, 40 and 36a, 38a, 40a, respectively, corresponding protuberances facing each other.

The upper and lower parts 28, 30, respectively, are plate-like in form and preferably extend along the entire upper and lower lengthwise edge, respectively, of the section 12 which faces the section 10. The protuberant ribs 36, 36a are each wider at their outer end than at the base thereof, and extend upwardly (or downwardly, as the case may be) at an outwardly extending acute angle as measured with respect to a plane perpendicular to the flat surface of the part 28 or 30 which extends parallel to the longitudinal axis of the section 12.

The protuberant ribs 38, 38a are each disposed at an inwardly extending acute angle as measured with respect to a plane which is perpendicular with respect to the flat surface of the part 28 or 30 and which extends parallel to the longitudinal axis of the section 12. Each of the protuberant ribs 38, 38a is wider at its outward end than it is at its inward end.

The space between the adjacent protuberant ribs 36, 38 and 36a, 38a has the configuration of a U-shaped channel whose side walls are adjacent sides of the ribs 36, 38 and 36a, 38a, respectively.

The protuberant bearing ribs 40, 40a, as well as the ribs 38, 38a, extend in the same direction, as do the ribs 36, 36a.

The protuberant ribs 40, 40a are less finger-like in transverse cross sectional configuration than are the ribs 36, 36a, and 38, 38a having a wide base with the side adjacent to the section 12, and having a substantially uniform slope, usually less than 45 degrees, while the other side slopes uniformly downwardly from the rounded top and then slopes less steeply as it extends to the base of the rib 38 or 38a, respectively.

The male section 24 has a bore shaped as a trapezoidal tube in which the large base faces the section 10 and the slope of the side wall 48, 50a are equal to each other and also approximately equal to the slope of the wall of the rib 40 or 40a which is closest to the section 12. The small base part 50 is disposed about midway between the sections 10, 12 when the sections are joined.

The exterior surface part of the male section 24 contains ribs 42, 42a, 44, 44a, and 46, 46a on its upper and lower surfaces, respectively, which are generally complementary in size, shape and position with respect to the ribs in the female section. That is, the ribs 44, 46 and 44a, 46a are shaped to fit slidably in the space between the ribs 36, 38 or 36a, 38a and 38, 40 or 38a, 40a, respectively. The space between the rib 42, 44 or 42a, 44a is shaped to receive the rib 36 or 36a, respectively.

Further, in assembly, the male and female sections 24, 26 are joined together by bending the parts 28, 30 of the female section downwardly, as by the tool bars 52, to interleave the ribs of each part and then by bending the ribs 42, 42a towards the section 12 to lock the joined male and female sections together. As the parts 28, 30 are pressed downwardly, too, some cold flow of metal in ribs 46 occurs which tends to move the top of the ribs 46, 46a towards the section 10, thus holding the ribs 38 or 38a more securely in position.

It can be seen that the coupling joint between the sections 10, 12 provides an essentially tapered connection similar to a tapered pipe thread. Such an arrangement results in a configuration of the female part of the joint which doesn't require as wide an entry opening as would be required if the locking elements were arranged in a plane parallel to the top and bottom surfaces of the parts to be joined.

It should be noted, too, that the ribs 42 or 42a on the male part provides a positive lock of the outer locking ribs 36 or 36a on the female part.

The strong central part 50 of the joint tends to prevent bending of the top and bottom of the joint while it is under load.

Thus, it may be seen that utilizing the joining feature of this invention provides a composite structural unit which has the strength and is on substantially the same external configuration as such panels composed of a single integral structure.

What is claimed is:

1. A composite structural unit comprising:

(a) a pair of elongated plate-like members each having, when joined together, a generally flat overall upper and lower surface, said plate-like members each having an edge part having joining means thereon;

(b) said joining means comprising a female coupling section rigidly secured to said edge part of one plate-like member and a male coupling section rigidly secured to said edge part of the other of said pair of plate-like members;

(c) said female coupling section having an upper and lower part extending lengthwise of said upper and lower surface of its plate-like member and outwardly from its plate-like member, said part having a pair of spaced apart, parallel locking ribs and a bearing rib extending towards the interior of said plate-like member, said bearing rib being closest to the plate-like member;

(d) said male coupling section having a closed looped part including sides which extend angularly inwardly towards each other, each of said sides having three spaced apart parallel locking ribs extending therefrom in the direction of the closest of said surfaces, said locking ribs of both sides of said male section having a configuration adapted to receive the locking ribs of said female section in the space defined by the walls of the locking ribs of said male section and to mate with the space between the walls of the locking ribs and bearing ribs of said female section, the locking ribs of said male section which are nearest to and furthest from said plate-like member being deformable to bear against the side wall of the adjacent locking ribs of the female coupling section when said composite unit is operatively assembled to lock said adjacent locking ribs in said female coupling section whereby said upper and lower part thereof resists outward movement.

2. A structural unit in accordance with claim 1, wherein said unit is made of a light metal alloy.

3. A structural unit in accordance with claim 1, wherein said plate-like members have a length which is at least several times their width.

References Cited

UNITED STATES PATENTS

| | | | |
|---|---|---|---|
| 1,617,274 | 2/1927 | Romer. | |
| 1,826,114 | 10/1931 | Young | 52—615 |
| 2,891,525 | 6/1959 | Moore | 29—515 |
| 3,061,349 | 10/1962 | Dellith. | |
| 3,093,219 | 6/1963 | Ramme | 52—594 |

FOREIGN PATENTS

| | | |
|---|---|---|
| 136,268 | 3/1902 | Germany. |
| 913,328 | 12/1962 | Great Britain. |
| 416,332 | 11/1946 | Italy. |

HENRY C. SUTHERLAND, Primary Examiner

U.S. Cl. X.R.

29—509, 515, 521; 52—594, 615; 94—13